United States Patent

[11] 3,625,817

[72] Inventor James H. Anderson
 1615 Hillock Lane, York, Pa. 17403
[21] Appl. No. 733,160
[22] Filed May 29, 1968
[45] Patented Dec. 7, 1971

[54] BINARY POWER CYCLE FOR NUCLEAR POWER PLANTS
 6 Claims, 2 Drawing Figs.

[52] U.S. Cl. .................................................. 176/38,
 176/51, 176/55, 176/65, 62/62, 60/38
[51] Int. Cl. .................................................. G21e 9/00
[50] Field of Search ....................................... 176/38,
 51–53, 55, 65, 60; 62/467 P, 467 R, 62; 60/38, 95

[56] References Cited
 UNITED STATES PATENTS
 3,218,802 11/1965 Sawle .......................... 176/65 X Primary Examiner—Carl D. Quarforth
Assistant Examiner—Harvey E. Behrend
Attorney—Kemon, Palmer & Estabrook ABSTRACT: An emergency heat sink for a nuclear-powered, steam-generating plant is disclosed which comprises a closed refrigerant circuit including a boiler, a turbine, a condenser and a return pump, the boiler using as a source of heat the condenser in the steam-generating plant. When an abnormal condition occurs such as a runaway reactor, the high-pressure side of the refrigerant circuit is vented to atmosphere and additional liquid refrigerant is bled into the low-pressure side in order to absorb the excess heat and dump it to the atmosphere until reactor control is regained.

INVENTOR
JAMES H. ANDERSON 3,625,817

BINARY POWER CYCLE FOR NUCLEAR POWER PLANTS

BACKGROUND OF THE INVENTION

This invention relates to nuclear-powered, steam-generator plants and more particularly to an emergency heat sink for such plants.

A conventional nuclear-powered, steam-generator plant employs a converter boiler which is heated by hot fluids from the reactor to generate steam at high-temperature and pressure. Steam turbines connected to the boiler drive electrical generators for producing electric power. In the event of a malfunction of the control portion of the reactor, a situation can be created where there is a sudden increase in both temperature and amount of steam delivered to the turbine which cannot be safely controlled by conventional techniques. Venting of the steam to the atmosphere could be dangerous due to the possibility of contamination of the steam under these conditions with radioactive material.

Accordingly it is the principal object of the present invention to provide an emergency means for disposing of excess amounts of heat occasioned by a malfunction of the reactor in a nuclear-powered generator plant. A further object of the present invention is to provide an emergency heat sink which during normal operation of the generating plant is effective to increase the overall efficiency of the plant and increase the generating capacity thereof.

SUMMARY OF THE INVENTION

In general, the objects of the present invention are achieved by providing a secondary boiler and turbine circuit which uses as the working fluid a refrigerant having a boiling point substantially lower than the condensing temperature of steam in the primary circuit. The boiler for the secondary circuit derives its source of heat from the steam condenser of the primary circuit. Under emergency conditions such as would be occasioned by a runaway reactor, the refrigerant fluid in the secondary circuit is vented to atmosphere and at the same time additional refrigerant is bled into the low-pressure side of the secondary circuit.

DETAILED DESCRIPTION OF THE DRAWINGS

Figure 1:
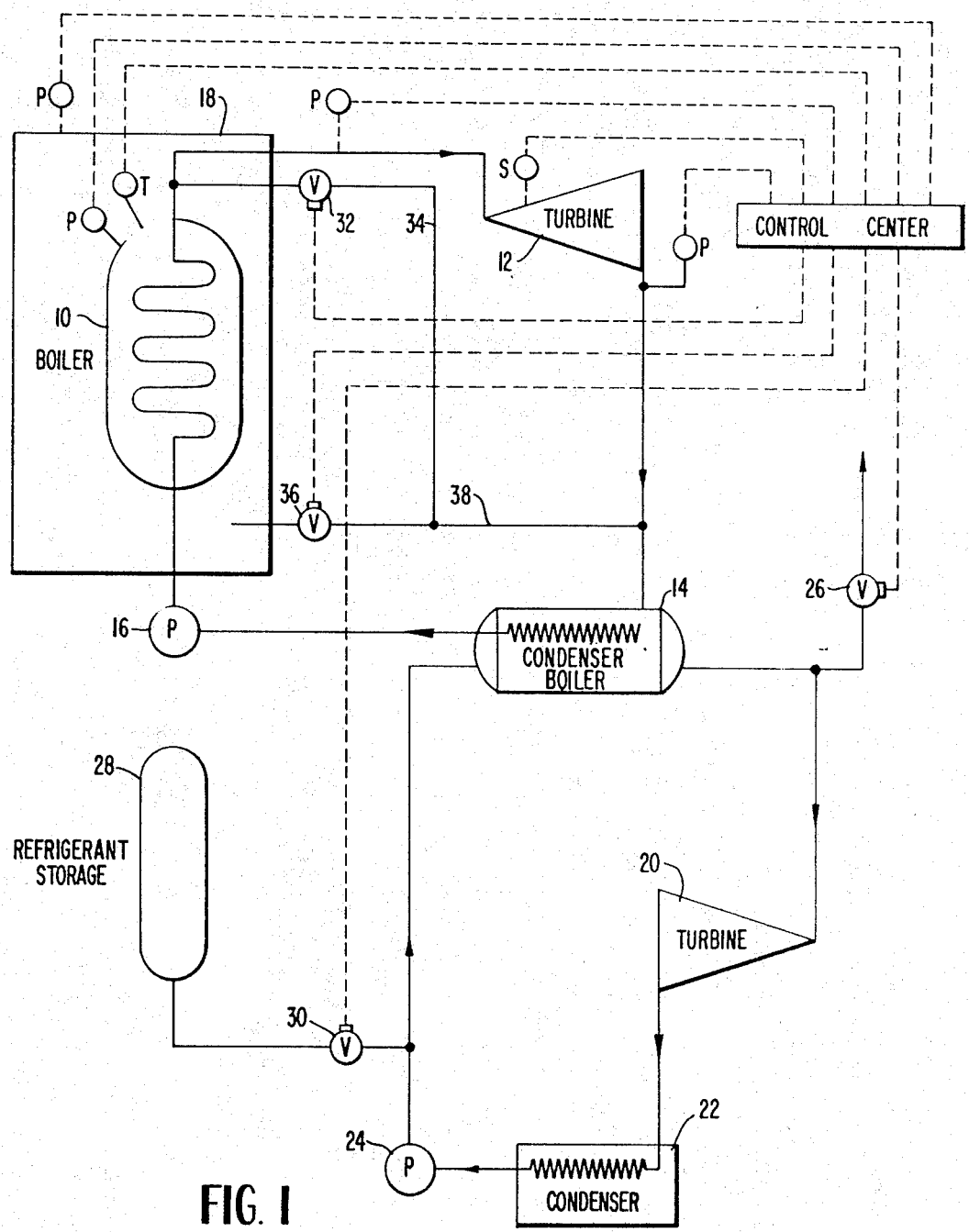
FIG. 1 is a flow diagram of a preferred embodiment of the heat sink in accordance with the present invention.

Referring first to FIG. 1 of the attached drawings it will be seen that the primary steam circuit includes a converter boiler 10 feeding a steam turbine 12. The exhaust steam from the turbine 12 passes through a condenser 14 and then to a boiler feed pump 16 which returns the condensate to the boiler. The boiler 10 is housed within a containment vessel 18 and it will be understood that the source of heat for the boiler comes from a nuclear reactor of any known construction.

In the event that there is a malfunction of the reactor control resulting in a runaway reactor condition, the output of the boiler 10 would rapidly become so high that it could not be handled by conventional controls. In order to cope with situations of this kind, the secondary circuit shown in this figure has been added. It will be seen that the secondary circuit also includes a boiler which is the condenser 14 of the primary circuit and in this instance the source of heat for the boiler of the secondary circuit.

The outlet from the secondary boiler supplies fluid to a turbine 20 which is exhausted to a condenser 22 and the condensate is returned to the boiler by a condensate pump 24. During normal operation of the primary circuit, a secondary circuit functions to increase the overall efficiency of the entire plant. The fluid contained in the closed secondary circuit is preferably a refrigerant having a boiling point substantially lower than the condensing temperature of the steam in the primary circuit.

In order to provide for the unusual excess amounts of heat which would be present in the primary circuit in response to a runaway condition of the reactor, the secondary circuit includes a valve 26 which vents the refrigerant to the atmosphere. Operation of this valve would be automatic and dependent on sensing an abnormal condition in the primary circuit. A liquid storage reservoir 28 is connected in the secondary circuit so that as soon as valve 26 is opened, additional liquid refrigerant from the storage 28 is bled into the high-pressure side of the secondary circuit. This bleeding in of the refrigerant from the storage vessel 28 could be either by gravity flow if the vessel is positioned above the level of the boiler steam condenser 14, or it could be under the control of an automatic valve indicated at 30 and which valve would be operated simultaneously with operation of valve 26. Normally the pressure in the boiler will be above atmospheric and the temperature will be considerably above atmospheric temperature. Under these conditions if the reservoir is kept at atmospheric temperatures, then at the temperature corresponding to the boiler pressure the vapor would remain in the condensed state as a liquid in the reservoir. If then the atmospheric relief valve is suddenly opened and the pressure dropped to atmospheric pressure, the liquid in the reservoir would tend to boil and force the liquid out through the condenser and the atmospheric relief valve. For this reason, if the reservoir is above the refrigerant boiler, and the vapor pressure at atmospheric temperatures is above atmospheric pressure, then the liquid would automatically flow out of the reservoir into the refrigerant boiler when the relief valve was opened. In such a case a valve would not be necessary between the reservoir and the refrigerant boiler line.

On the other hand, in the case where a higher pressure or lower boiling point refrigerant is kept in the reservoir, then a connecting valve is required.

This arrangement permits the dumping into the atmosphere of a relatively harmless fluid such as a low-boiling point refrigerant and there is little or no possibility that this fluid would be contaminated by radioactive matter which conceivably could contaminate the steam in the primary circuit and would therefore preclude solving the emergency problem by simply venting steam from the primary circuit into the atmosphere.

Since it is entirely possible that the steam turbine 12 in the primary circuit would be unable to pass the amount of steam generated in the boiler 10 in response to an emergency condition of the reactor, a further automatic valve 32 is positioned in a bypass line 34 which leads from the high-pressure side of the boiler directly to the input of the steam condenser. It is contemplated that this valve would open simultaneously with valves 26 and 30.

A further emergency valve 36 is positioned in a line 38 leading between the interior of the containment vessel 18 and the input to the condenser 14. In the event that a steam line within the containment vessel should rupture, opening of the valve 36 would vent the excess pressure directly to the steam condenser 14, where the steam would be condensed by heat exchange with the low-boiling point refrigerant liquid in the secondary circuit thus preventing rupture of the containment vessel itself.

Obviously it would be well within the ability of one skilled in this art to provide for automatic actuation of any and all of the aforedescribed emergency valves in response to temperature or pressure conditions in any part of the system and also in the case of the turbine 12, in response to an abnormal speed condition thereof. FIG. 1 illustrates in diagrammatic form one possible arrangement. A plurality of pressure and temperature sensors indicated in the drawing as P and T, respectively, together with a speed sensor S on the turbine 12, all have their outputs fed to a common control center which in turn is connected to each of the emergency valves 26, 32, 30 and 36. As will be apparent to those skilled in this art, the valve 32, for example, which bypasses the turbine 12 could be operated in response to a signal from the speed sensor S connected to the turbine or this valve could also be opened in response to excess pressure in the steam line as sensed by a pressure sensor P tapped into that line. The foregoing control arrangement is intended to be illustrative only and not necessarily limiting.

Figure 2:
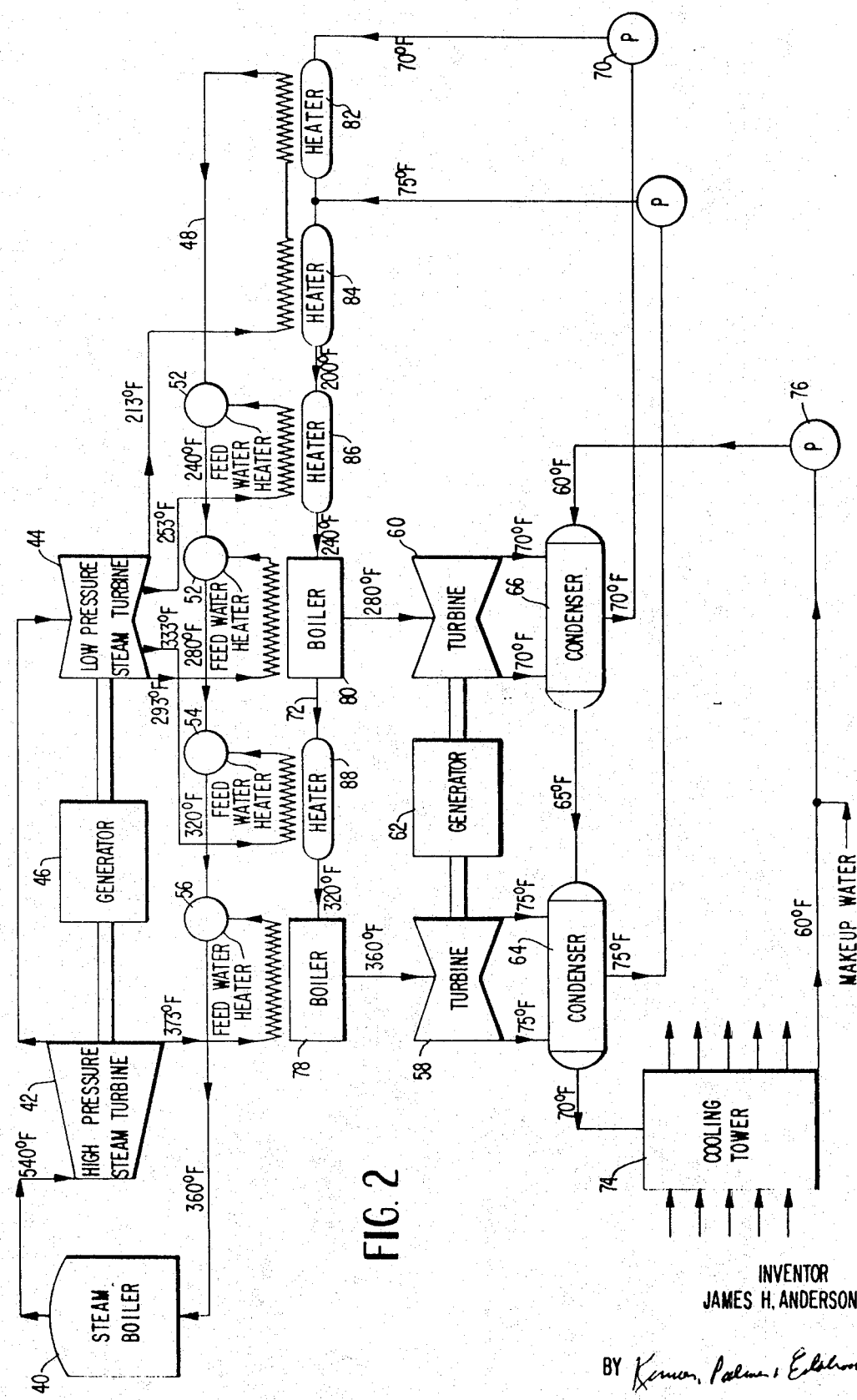
FIG. 2 is a flow sheet of a complete binary cycle power plant.

Referring now to FIG. 2 of the attached drawings, a more complete binary cycle power plant is illustrated and it will be understood that the heat sink operation of the secondary cycle as described with reference to FIG. 1 may be included in the plant shown in FIG. 2, as well as the emergency valves and control arrangements thereof.

In FIG. 2 a steam boiler 40 heated by hot fluids from a nuclear reactor supplied steam at high-pressure, and temperature to a pair of turbines 42 and 44 which are high- and low-pressure steam turbines, respectively. Both turbines are mechanically coupled to drive a generator 46. The various exhausts from the high- and low-pressure turbines are returned through a common line 48 through a series of feed water heaters 50, 52, 54 and 56 to the inlet of the boiler 40. In the secondary circuit which uses a low-boiling point refrigerant as the working fluid, a high-pressure turbine 58 and a low-pressure turbine 60 are mechanically coupled to drive a generator 62. The exhaust from turbines 58 and 60 go to condensers 64 and 66, respectively, and the condensate is returned by pumps 68 and 70 to a common return line 72. Cooling water for the condensers 64 and 66 may be supplied from a conventional cooling tower 74 and is circulated through the two condensers by a pump 76.

The two boilers in the secondary circuit 78 and 80 and which are high- and low-temperature boilers, respectively, utilize steam from the primary circuit as a source of heat. Boiler 78 is heated directly by the exhaust from the high-pressure turbine 42 and boiler 80 in turn is heated by steam exhausted from the low-pressure turbine 44. In addition to the heat supplied directly to the boilers 78 and 80, there are a series of intermediate heaters in the common line 72 of the secondary circuit and these are shown at 82, 84, 86 and 88. Each of these heaters uses steam exhausted from various stages of low-pressure turbine in order to add heat to the refrigerant fluid in the secondary circuit. The temperatures of the steam and refrigerant fluid at the various points indicated in the drawing are intended to be illustrative of one possible temperature mode of operation of a power plant in accordance with this invention, but are in no way limiting as to the scope of the invention. They serve to illustrate clearly, however, that the use of two low-temperature turbines at two different pressure and temperature levels in the secondary circuit is effective to balance out the heat flow between the fluids in the primary and secondary circuits in a more effective manner and thereby improve the overall plant efficiency. While the use of two turbines in series in each circuit will improve the overall plant efficiency over a similar system using only a single turbine in each circuit, the efficiency could obviously be further improved by using more than two turbines in series in each fluid circuit and such a modification is intended within the scope of the present invention.

From the foregoing it will be apparent to those skilled in this art that there is herein shown and disclosed new and useful improvements in binary cycle power plants. While preferred embodiments have been shown and disclosed, applicant nevertheless claims the benefit of a full range of equivalents within the scope of the appended claims.

I claim:

1. A binary cycle nuclear power plant comprising:
    a. a closed steam circuit including a steam boiler, a steam turbine, a steam condenser and a condensate pump connected in series in the order named;
    b. a closed refrigerant circuit including a refrigerant boiler, a refrigerant turbine, a refrigerant condenser and a condensate pump connected in series in the order named, said refrigerant boiler utilizing as a source of heat, the heat in said steam condenser;
    c. a normally closed bypass valve connected between the high-pressure side of said steam boiler and said steam condenser;
    d. a normally closed vent valve connected between the high-pressure side of said refrigerant boiler and the atmosphere;
    e. a reserve storage of liquid refrigerant connected to the high-pressure side of said refrigerant circuit;
    f. and means to open said valves in response to an abnormal rise in pressure in said steam boiler; wherein when said valves are open, steam from said steam boiler at least partially bypasses said steam turbine and the excess heat is absorbed in the refrigerant boiler, refrigerant is vented to the atmosphere from the high-pressure side of the refrigerant boiler and additional refrigerant liquid is fed to said refrigerant boiler from said reserve storage.

2. The combination defined by claim 1 in which the refrigerant in said reserve storage has a boiling point lower than that of the refrigerant in said refrigerant circuit.

3. The combination defined by claim 1 including a containment vessel housing said steam boiler, and a line connecting the interior of said containment vessel to said steam condenser, and a normally closed valve in said line.

4. The combination defined by claim 1 including a normally closed valve connected between said reserve storage and said refrigerant boiler.

5. In a binary cycle nuclear power plant of the type which includes a converter boiler, a steam turbine, a steam condenser and a pump connected in a closed loop, an emergency heat sink for rapid dissipation of excess heat in said boiler due to reactor or control malfunction comprising:
    a. a turbine, a condenser, a pump and a heat exchanger connected in a closed fluid circuit, said heat exchanger deriving heat from said steam condenser. said circuit containing a refrigerant fluid having a boiling point lower than the condensing temperature of steam in said steam condenser;
    b. normally closed valve means connected to said closed fluid circuit for venting to atmosphere in response to excessive pressure or temperature rise in the steam circuit;
    c. and refrigerant liquid storage means connected to supply additional refrigerant to said fluid circuit whenever said valve means is actuated.

6. A plant as defined by claim 5 in which the refrigerant contained in said storage means has a boiling point which is lower than the boiling point of the refrigerant in said closed fluid circuit.

* * * * *